United States Patent [19]

Vass

[11] 4,169,429

[45] Oct. 2, 1979

[54] HOG SQUEEZE BOX ASSEMBLY

[76] Inventor: Alex Vass, Box 158, Lestock, Canada

[21] Appl. No.: 797,052

[22] Filed: May 16, 1977

[30] Foreign Application Priority Data

May 26, 1976 [CA] Canada .................................. 253371

[51] Int. Cl.² .............................................. A61D 3/00
[52] U.S. Cl. ...................................................... 119/99
[58] Field of Search ................... 119/99, 102, 103, 98; 43/63

[56] References Cited

U.S. PATENT DOCUMENTS

| | | | |
|---|---|---|---|
| 235,553 | 12/1880 | Morris et al. | 43/63 |
| 932,384 | 8/1909 | Garnett | 119/99 |
| 1,109,820 | 9/1914 | Burcham | 119/103 |
| 3,043,269 | 7/1962 | Kausche | 119/98 |

*Primary Examiner*—Russell R. Kinsey
*Assistant Examiner*—Daniel J. Leach
*Attorney, Agent, or Firm*—Stanley G. Ade

[57] ABSTRACT

A box-like frame contains a squeeze gate component, a floor and a pair of side frames pivotally secured one to each side of the floor and normally held apart at the upper ends by a latch bar. When a hog or the like enters the gate, it displaces the latch bar and enables the sides to fall inwardly whereupon a rope or cable is connected to the upper ends of the side frames and to an overhead winch. This enables the squeeze gate together with the animal to be lifted clear of the floor for treatment purposes or for weighing by means of a spring scale which is connected between the winch handle and the frame.

11 Claims, 6 Drawing Figures

HOG SQUEEZE BOX ASSEMBLY

BACKGROUND OF THE INVENTION

This invention relates to new and useful improvements in squeeze box assemblies primarily designed for use on hogs, but of course being usable for other small animals.

It is desirable, when treating animals for various purposes, to hold them by means of a squeeze box assembly and these squeeze boxes are usually relatively involved constructions utilizing linkage levers and the like.

These are not always satisfactory, particularly when used on relatively small animals such as hogs, sheep and the like.

It is also often desirable, particularly when dealing with animals such as sheep or hogs, to be able to weigh the animal readily and easily and this not possible with conventional squeeze boxes.

SUMMARY OF THE INVENTION

The present invention overcomes these disadvantages by providing a general box-like framework within which is situated a squeeze box component consisting of a floor and a pair of sides hinged by the lower edges thereof one upon each side of the side edges of the floor. A latch bar detachably extends between the upper ends of these sides and the latch bar is knocked out of the way as the animal enters the squeeze box component thus permitting the sides to fall inwardly towards the animal so that the upper ends are relatively close together. An overhead winch is supplied mounted on the framework and cables extend downwardly from the winch rod to adjacent the upper edge of one of the sides. Hooks or the like are provided on the upper edge of the other of the sides and the rope or cable is then engaged around the hooks so that when the winch is activated, the squeeze box component together with the animal therein, is held firmly and elevated clear of the ground.

A spring scale is then connected between the winch handle and frame and a simple calculation enables the operator to ascertain the weight of the animal. At the same time, of course, the animal can be treated as desired.

The principal object and essence of the invention is therefore to provide a device of the character herewithin described which enables animals to be held firmly and elevated clear of the ground for treatment purposes and weighing if necessary.

Another object of the invention is to provide a device of the character herewithin described in which the device includes latch means engaged by the animal, to permit the sides to fall inwardly once the animal is within the squeeze box component.

Another object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Figure 3:
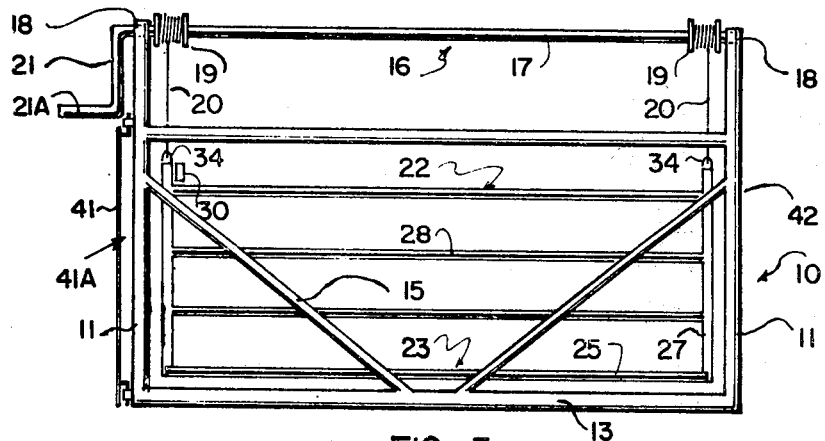
FIG. 3 is a side elevation of FIG. 1.
Figure 4:
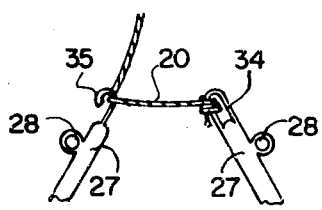
FIG. 4 is an enlarged fragmentary view showing the engagement of the cable with the upper ends of the two sides.
Figure 5:
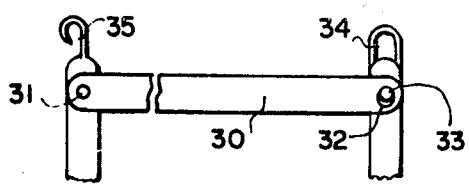
FIG. 5 is a fragmentary front elevation showing the latch means.

Proceeding therefore to describe the invention in detail, reference character 10 illustrates generally the framework of the device which is substantially box-like and includes vertical corner members 11, horizontal base members 12, longitudinally extending members 13 and upper cross members 14. FIG. 3 shows diagonal braces 15 extending between the longitudinal members 13 and vertical members 11.

A winch assembly collectively designated 16 is mounted upon the upper side of the framework 10 and consists of a rod 17 journalled for rotation within bearings 18 situated substantially centrally on the upper cross members 14, said rod extending from one end of the framework 10 to the other as clearly shown in FIG. 3.

Winch drums 19 are secured to the rod 17 adjacent each end thereof and winch cables or ropes 20 extend around these drums and downwardly therefrom as will hereinafter be described. A crank type handle 21 is secured to one end of the rod 17 for rotation of the rod and hence the winch drums 19.

Figure 6:
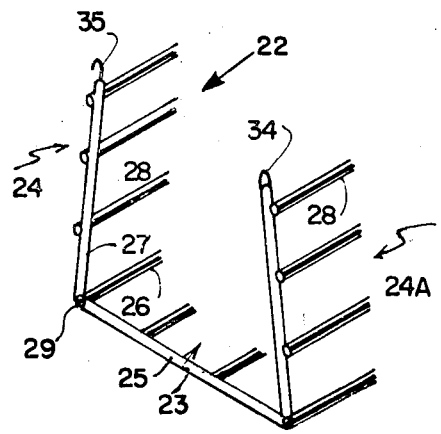
FIG. 6 is a fragmentary isometric view of the squeeze box component in the open position.

A squeeze box component is provided collectively designated 22. This consists of a floor collectively designated 23 and a pair of sides collectively designated 24 and 24A and shown in FIG. 6.

The floor 23 includes a pair of transverse end members 25 and a plurality of longitudinally extending members 26 extending between transverse members 25. These members 26 are preferably cylindrical in shape to prevent damage occurring to the animal.

Each side 24 and 24A includes upwardly extending end members 27 and longitudinally extending members 28. Once again the members 28 are preferably cylindrical in configuration to prevent damage occurring to the animal.

The members 27 are pivoted to adjacent the corners of the floor by means of pivot joints 29 which are conventional and these sides, normally fall inwardly to one another pivoting around the pivot assemblies 29. This movement is due to the fact that a latch bar or member 30 normally maintains the upper ends apart but inclined slightly inwardly so that if the latch bar or member 30 is removed, the two sides fall inwardly and take up the position shown in FIG. 2.

The latch bar 30 is pivoted by one end thereof as at 31, to adjacent the upper side edge of one of the sides 24 and is apertured adjacent the other end as at 32 to freely engage the pin 33 situated adjacent the upper side edge of the other side 24A. This latch member 30 is preferably situated at one end of the component 22 but of course may be situated part way along if desired.

It is positioned so that an animal entering from the other end of the component, will displace the latch member 30 thus causing the sides to fall inwardly and engage the sides of the animal within the component 22.

This operation is normally automatic but, of course, if desired, it will be appreciated that the operator can displace the latch member 30 if the animal is in position and has not disengaged the latch member during its entry into the squeeze box component 22.

Figure 1:
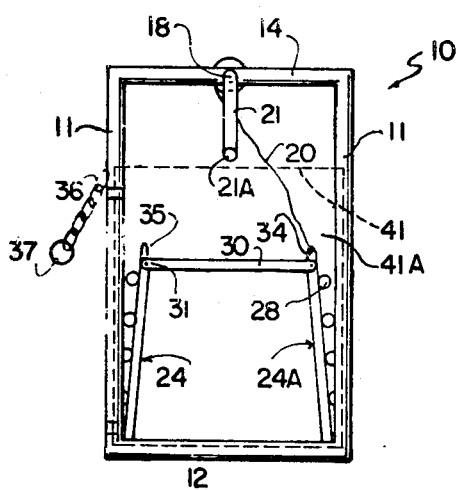
FIG. 1 is a front end view of the device showing the squeeze box component in the open and lowered position.
Figure 2:
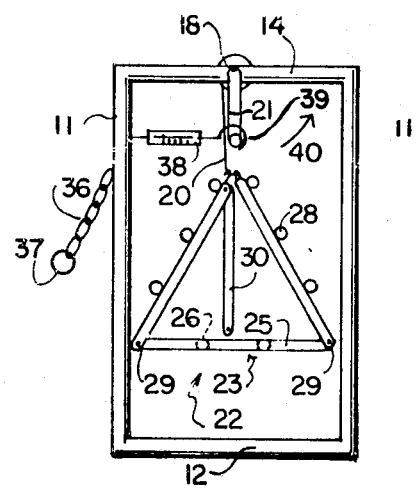
FIG. 2 is a view similar to FIG. 1, but showing the squeeze box component closed and elevated, the animal not being shown for clarity.

The aforementioned cables 20 are secured by the other ends thereof to rings 34 or the like secured at or adjacent to the upper side edges of one of the components 24A and adjacent the ends of this upper edge. When in the position shown in FIG. 1, the cables 20 are slighly slack and it will be observed that hook components 35 are secured to the other side 24 in positions similar to the rings 34. When the sides fall together as shown in FIG. 2, the operator merely loops the slack cable around the hooks 35 thus joining the sides together at the upper edges thereof so that when the crank 21 is rotated in one direction, the squeeze box component 22 is elevated as illustrated in FIG. 2, holding the animal firmly therein. In this connection it should be observed that the open frame construction of the floor 23, permits the animal's legs to extend downwardly through the floor which supports the animal by the underside thereof.

When the squeeze box component 22 is elevated to a sufficient degree, a check chain 36 secured by one end thereof to one of the corner members 11 of the frame, is engaged over the portion 21A of the handle by means of the ring 37 thus holding the component 22 in the elevated position while the animal is being treated.

If it is desired to weigh the animal, then a spring balance asssembly 38, which is pivotally secured by one end thereof to the member 11, is swung over so that the hook 39 engages the handle portion 21A whereupon the ring 37 is removed. The weight of the animal within the component 22 acts upon the handle which is endeavoring to move in the direction of arrow 40, thus registering upon the spring scale 38 so that a simple calculation enables the operator to ascertain the weight of the animal held within the component 22.

The door or closure panel 41 is hinged by one edge thereof to one of the members 11 and may be used to close off the exit end 41A of the assembly, it being understood that the animal normally enters by the other end 42 thereof.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A squeeze box assembly for hogs and the like comprising in combination a main frame, a squeeze box component, a winch assembly mounted on said main frame, cable means extending between said squeeze box component and said main frame for elevating and lowering said squeeze box component within said main frame, said squeeze box component including a floor and a pair of sides pivoted by the lower edges thereof one upon each side of said floor, and latch means detachably extending between said sides normally maintaining the upper ends of said sides in spaced apart relationship, the displacement of said latch means by an animal entering said squeeze box component permitting the upper ends of said sides to swing inwardly towards one another, said winch assembly being situated on the upper side of said main frame and includes a longitudinally extending rod journalled for rotation within said main frame, a handle on one end of said rod and a spring scale detachably securable between said main frame and one end of said handle.

2. The assembly according to claim 1 which includes a closure panel at one end of said main frame hinged by one edge thereof to one side of said framework.

3. The assembly according to claim 1 in which said winch means is situated on the upper side of said main frame and includes a longitudinally extending rod journalled for rotation within said main frame, a handle on one end of said rod and spring scale detachably securable between said main frame and one end of said handle.

4. The assembly according to claim 1 in which said cable means is operatively connected by one end thereof to said winch means and by the other end thereof to adjacent the upper end of one of said sides of said squeeze box component, and means adjacent the upper end of the other of said sides of said squeeze box component, detachably engageable by said cable when said sides are swung inwardly as aforesaid, whereby said squeeze box component is elevated and lowered by said winch, by the upper ends of said sides.

5. The assembly according to claim 2 in which said cable means is operatively connected by one end thereof to said winch means and by the other end thereof to adjacent the upper end of one of said sides of said squeeze box component, and means adjacent the upper end of the other of said sides of said squeeze box component, detachably engageable by said cable when said sides are swung inwardly as aforesaid, whereby said squeeze box component is elevated and lowered by said winch, by the upper ends of said sides.

6. The assembly according to claim 4 which includes cable means at each end of said squeeze component.

7. A squeeze box assembly for hogs and the like comprising in combination a main frame, a squeeze box component, a winch assembly mounted on said main frame, cable means extending between said squeeze box component and said main frame for elevating and lowering said squeeze box component within said main frame, said squeeze box component including a floor and a pair of sides pivoted by the lower edges thereof one upon each side of said floor, and latch means detachably extending between said sides normally maintaining the upper ends of said sides in spaced apart relationship, the displacement of said latch means by an animal entering said squeeze box component permitting the upper ends of said sides to swing inwardly towards one another, said cable means being operatively connected by one end thereof to said winch means and by the other end thereof to adjacent the upper end of one of said sides of said squeeze box component, and means adjacent the upper end of the other of said sides of said squeeze box component, detachably engageable by said cable when said sides are swung inwardly as aforesaid, whereby said squeeze box component is elevated and lowered by said winch, by the upper ends of said sides.

8. The assembly according to claim 5 which includes cable means at each end of said squeeze box component.

9. The assembly according to claim 7 which includes a closure panel at one end of said main frame hinged by one edge thereof to one side of said framework.

10. The assembly according to claim 5 which includes cable means at each end of said squeeze box component.

11. The assembly according to claim 9 which includes cable means at each end of said squeeze box component.

* * * * *